Figure 4:
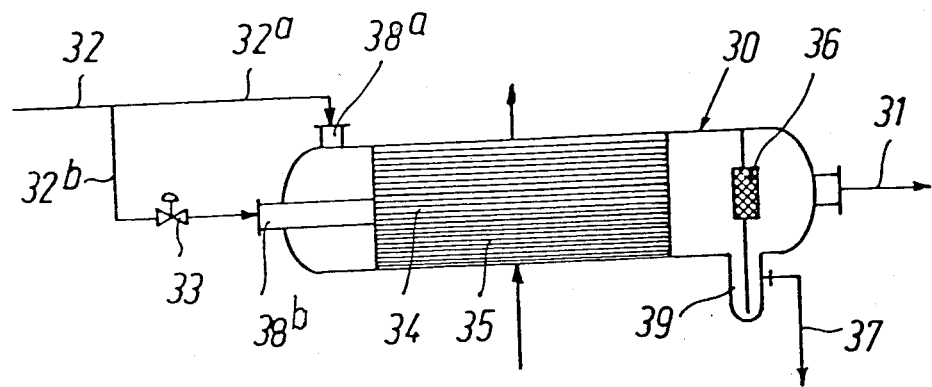

United States Patent [19]

Lell

[11] Patent Number: 4,501,725
[45] Date of Patent: Feb. 26, 1985

[54] PROCESS FOR THE COMBUSTION OF $H_2S$ CONTAINING GASES

[75] Inventor: Rainer Lell, Kerpen, Fed. Rep. of Germany

[73] Assignee: Davy McKee AG, Frankfurt, Fed. Rep. of Germany

[21] Appl. No.: 480,898

[22] Filed: Mar. 31, 1983

[51] Int. Cl.³ ............................................. C01B 17/02
[52] U.S. Cl. .......................... 423/573 R; 423/573 G; 423/574 R; 423/576
[58] Field of Search ........... 423/573 R, 573 G, 574 R, 423/574 L, 574 G, 576; 422/160, 183

[56] References Cited

U.S. PATENT DOCUMENTS 3,758,676 9/1973 Goddin et al. .................. 423/573 G
3,854,876 12/1974 Rankine et al. ........................ 422/62
3,860,697 1/1975 Palm ................................ 423/574 G Primary Examiner—Gregory A. Heller
Attorney, Agent, or Firm—Bernard, Rothwell and Brown

[57] ABSTRACT

There is disclosed a process for the combustion of $H_2S$ containing gases with air and/or oxygen into elementary sulfur and separation of the sulfur from the reaction gas, in a load range from between 100 and 5%. The process takes place in a combustion zone equipped with burners, an adjoining reaction zone and several cooling zones, in which—possibly after previous reheating and further catalytic transformation into sulfur—the sulfur formed condenses and is then separated. The $H_2S$ containing gases are supplied to the combustion zone by one or several main burners in the high load range and by a by-pass burner in a low load range. In the low load range, a heating gas is also burned by a separate burner and the cooling surfaces in the cooling zones which are coated by the reaction gas are reduced.

8 Claims, 4 Drawing Figures

PROCESS FOR THE COMBUSTION OF H₂S CONTAINING GASES

The invention concerns a process and device for the combustion of $H_2S$ containing gases with air and/or oxygen into elementary sulfur and separation of the formed sulfur from the reaction gas.

The processing of gases containing hydrogen sulfide according to the Claus process is done in installations which can be operated in a load range between 100 and 20%. However, it is often necessary to keep the installation in operation even at loads below 20%. This could become necessary, for example, in refineries when, at times, raw oil which contains very little sulfur is processed and/or only a fraction of the capacity is used.

The current invention is based on the problem to create a process and a device for the transformation of $H_2S$ containing gases into elementary sulfur in a load range of 100 down to 5%, whereby also in the low load range a safe and trouble free operation can be assured. Especially in the load range of 20 to 5% it should be possible to have a safe combustion of the $H_2S$ containing gas and a vapor-free separation of the sulfur formed.

The invention is based on a process for the combustion of $H_2S$ containing gases with air and/or oxygen into elementary sulfur and the separation of the formed sulfur from the reaction gas in a combustion zone equipped with burners, an adjoining reaction zone and several cooling zones in which, if necessary, after previous reheating and further catalytic transformation into sulfur, the sulfur formed is condensed and then separated. The process is characterized, according to the invention, by the fact that the $H_2S$ containing gases are supplied to the combustion zone in a high load range essentially by one or several main burners and in a low load range by a by-pass burner, and that in the low load range heating gas is also burned by a separate burner and the cooling surfaces of the cooling zones which are coated by the reaction gas are reduced. Because of the fact that the $H_2S$ containing gas is supplied to the combustion chamber—in the low load range—by a separate by-pass burner which was specially arranged for this load range, and that—because of the burning of heating gas—the reaction temperature is kept at a sufficient level in this load range for a $H_2S$ combustion into sulfur, it is possible to obtain, even at a load range of 20 to 5%, a safe $H_2S$ conversion into elementary sulfur of more than 90%. By the reduction of the cooling surface which is coated with reaction gases within the low load range, the formation of sulfur vapors in the cooling zones is avoided and a vapor-free sulfur condensation is attained. The reduction of the cooling surface in the low load range has the further advantage during the reheating of the reaction gas coming from the cooling zones in in-line burners that heating gas can be saved when the in-line burners are operated with heating gas, or rather, that the degree of sulfur recovery of the whole process is raised when the in-line burners are operated with acid gas.

According to the preferred model of the process according to the invention, the switching from high load to low load running method takes place at a load in the range of between 15 and 40%, preferably at a load of about 25%. In the high load range it is, for example, possible that the main burner can take over 95 to 20% of the load, while the by-pass burner is continuously charged with the nominal load of 5%. If, in this case, a load of 25% is reached in descending direction, the switching can take place in such a way that the main burner turns off and the by-pass burner only remains in operation, and increases from 5 to 25% with the switching load.

By preference, the heating gas burner is switched on or off, depending on the temperature in the reaction zone or in the combustion zone. In this manner, the temperature in the reaction zone is kept at the optimal value for the sulfur formation, even in the low load range, which cannot be attained by the $H_2S$ combustion alone in the low load range. This temperature in the reaction zone—attained by the burning of heating gas—is generally in the range of 900° to 1150° C. in the low load range. The supply of heating gas to the heating gas burner is suitably controlled by the temperature in the reaction zone. In general, the heating gas combustion is switched on when the load has dropped to 40% or less, preferably to 25% or less.

According to the preferred model of the process according to the invention, the coating of the cooling surface with the reaction gas is switched over at a load in the range of 40 to 60%. When the load drops to a value below this range, the cooling surfaces coated by the reaction gas are reduced. In this way it is avoided that the gas velocity in the cooler drops too far and forms condensed vapor of elementary sulfur which is hard to separate in the conventional sulfur condensors.

Furthermore, it is designed, by preference, that the air supply to the combustion zone is controlled by a process chromatograph in the high load range through the amount of air to the main burner or burners, and in the low load range through the amount of air to the heating gas burner. The guiding value for regulating the air supply is set by the $H_2S/SO_2$ ratio in the reaction gas at the exit of the installation, i.e. after the last sulfur condensation before the final gas enters into a thermal or catalytic afterburning. For this control, it is possible to provide by-pass pipes with control valves on the main air valves of the air pipes to the main burners or to the heating gas burner which can be opened more or less, depending on the control commands coming from the chromatograph. In order to assure a safe combustion of the $H_2S$ containing gas even at very low load, the process air control is suitably done at the air pipe to the heating gas burner. It is suitable to restrict the air supply to the by-pass burner to a load range of 8 to 25%. Should the reheating of the reaction gas after the sulfur condensation be done with in-line burners, the air supply to the by-pass burner is eliminated at loads of below 8%, while, in a processing method without in-line burners, the operation takes place with air supply to the by-pass burner down to 5%. The supply of air to the by-pass burner is regulated to a constant ratio with the $H_2S$ containing gas, whereby the regulating—as stated above—is done by the air supply to the heating gas burner which is operating in any case in the low load range.

The device for the execution of the process according to the invention comprises a combustion oven which has a combustion chamber, a reaction chamber as well as burners for $H_2S$ containing gas and heating gas, a reaction gas cooler and at least one sulfur condensor/separator. The device is characterized, according to the invention, by the fact that in the combustion chamber wall there is at least one main burner for high load range and one by-pass burner and one heating gas burner for the low load range, and that the cooling surfaces of the sulfur condensor/separator are divided and one part of the cooling surfaces can be blocked off. While a heating gas burner in the conventional Claus ovens was only put into operation for start-up, in the device according to the invention, it serves the purpose to prevent the dropping of the reaction temperature in the low load range because too little heat is generated during the $H_2S$ combustion. Therefore, the heating gas burner has a continuous function within the low load range. The blocking off of a part of the cooling surface assures that in the low load range a certain mass velocity does not fall below a certain value in the cooling pipes, and therefore, the formation of sulfur vapors is avoided in the gaseous phase. If the sulfur condensor/separator has a bunch of pipes washed by a cooling medium, separate gas supply nozzles are provided—according to the invention—to the central pipes and to the pipes in the outer circle of the pipe bunch, and a closing device is installed in the gas pipe for the coating of the central pipes. The closing off of the central (inside) pipes assures that the central (closed off) pipes are washed by a sufficiently tempered cooling medium (water), so that a solidification of the sulfur in these pipes—which are not coated with reaction gas—is avoided.

Figure 1:
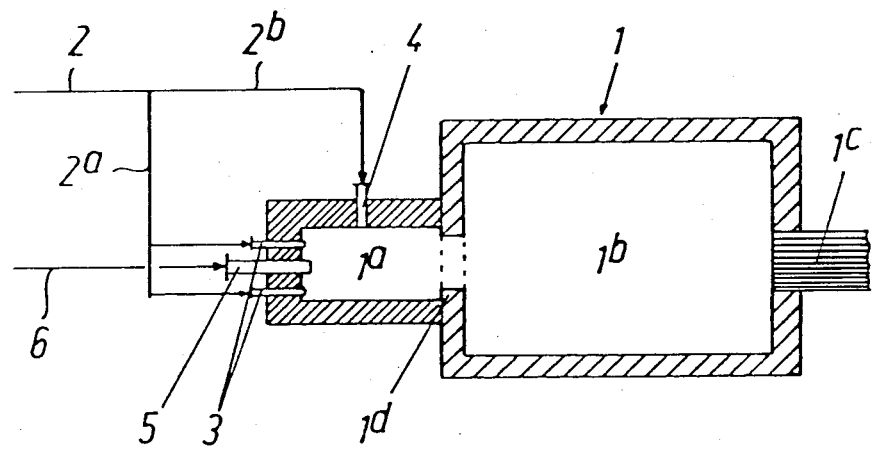
Figure 2:
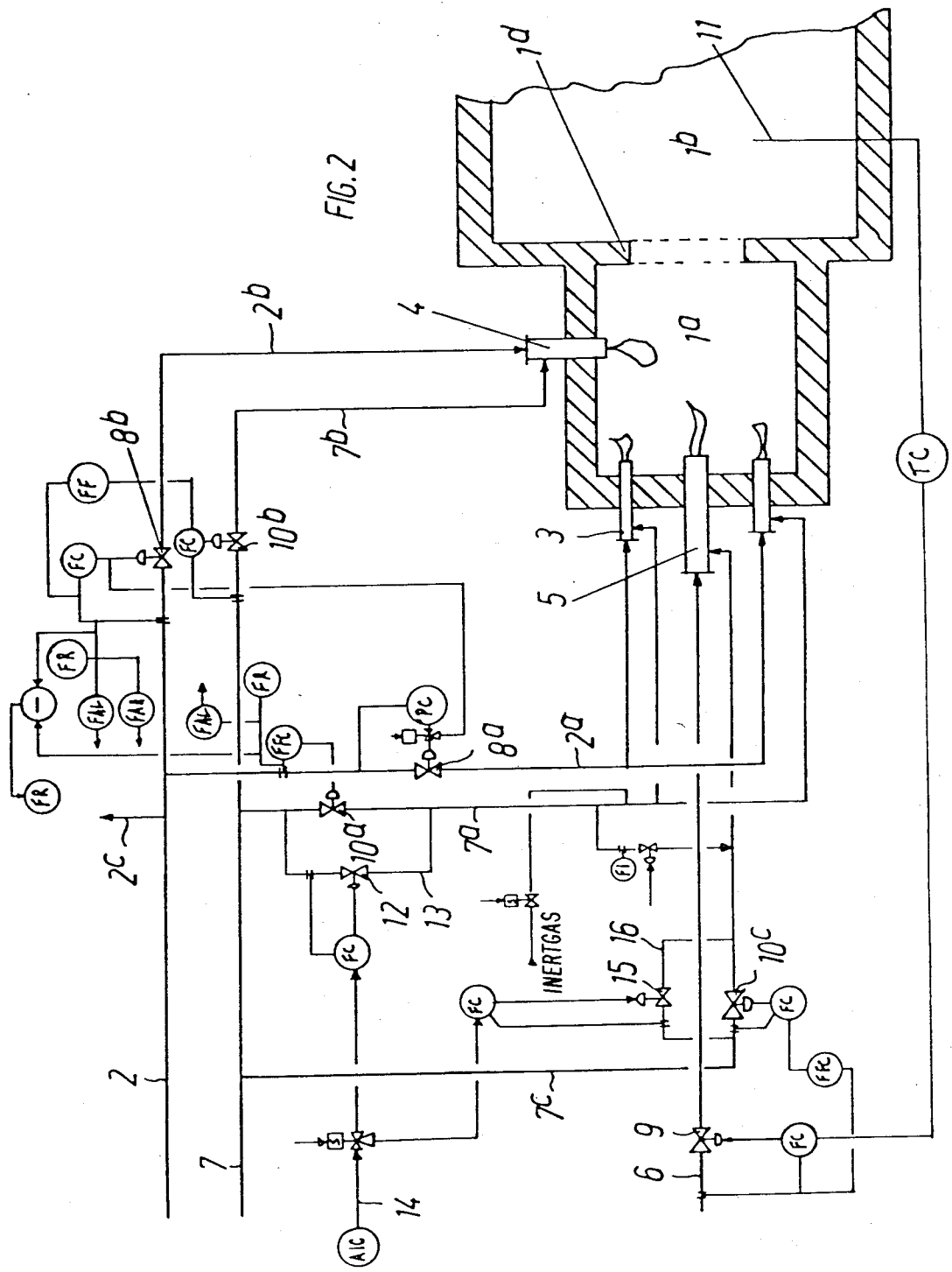
Figure 3:
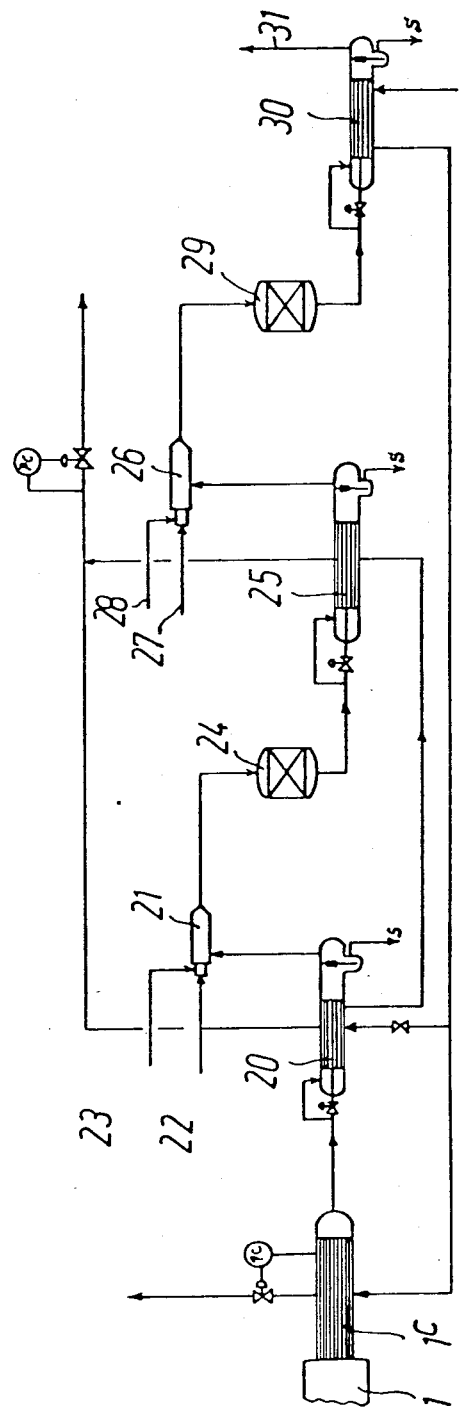

The invention is described more closely based on the drawings. They show:

FIG. 1—a schematic representation of the combustion oven with the burners for acid gas and heating gas;

FIG. 2—an enlarged partial representation of the combustion oven with the gas suppliers and the connected control devices;

FIG. 3—a schematic representation of the part of the device according to the invention which follows the combustion oven; and FIG. 4—a sulfur condensor, installed in the device according to the invention, in an enlarged scale.

According to FIG. 1, the combustion oven 1 comprises a combustion chamber $1^a$ and a reaction chamber $1^b$, to which is connected the first stage of the process gas cooler $1^c$. Between the chambers $1^a$ and $1^b$, a narrowed passage has been created by a skin plate $1^d$. The acid gas let in through pipe 2, can be supplied to the main burner 3 by pipe $2^a$; the main burner is shaped as a multi-nozzle burner. The acid gas can also be supplied to a by-pass burner 4 through the by-pass pipe $2^b$. Furthermore, the combustion chamber $1^a$ has a central heating gas burner 5 which is charged with heating gas by pipe 6.

As can be seen in FIG. 2, the acid pipes $2^a$ and $2^b$, as well as the heating gas pipe 6 have regulator valves $8^a$, $8^b$ and 9, the significance of which shall be described below. Oxygen or air is supplied to the burners 3, 4, 5 through the pipe 7 over the partial pipes $7^a$, $7^b$ or $7^c$, into which also regulator valves $10^a$, $10^b$ or $10^c$ are installed. The supplying of acid gas to the in-line burners takes place through pipe $2^c$.

As can be seen in FIG. 2, the valves $8^a$, $8^b$, 9 and $10^a$ to $10^c$ are integrated into a regulator system which permits a controlled supply of acid gas, heating gas and air to the burners 3 to 5. The operation of the heating gas valve 9 is regulated by a temperature probe 11 in the reaction chamber $1^b$ of the oven, as well as through a ratio control of the air valve $10^c$ in the connected air pipe $7^c$. The control of the combustion air is done by a process chromatograph (not shown) which determines the $H_2S/SO_2$ ratio in the reaction gas at the exit, i.e. after the last sulfur condensation before the gas enters a thermal or catalytic after burning. This control is used for the regulation of the amount of combustion air—in the load range between 25 and 100%—through pipe $7^a$ with a valve 12 in a by-pass pipe 13 to valve $10^a$. At loads below 25% the process chromatograph regulates the addition of combustion air to the heating gas burner 5 through control pipe 14 by means of valve 15, which is installed in a by-pass 16 to air valve $10^c$.

According to FIG. 3, the reaction gas first flows from the oven 1 through a first reaction gas cooler $1^c$, in which it is cooled to a temperature at least 10° to 20° above the sulfur dew point of the gas, and, therefore, avoids a sulfur condensation to the greatest extent possible. This results in the cooling of the gas while producing medium pressure steam. The reaction gas is then cooled in a cooler/condensor/separator 20 to a temperature below the sulfur dew point. By this process a considerable part of the sulfur formed is separated. The temperature of the cooled reaction gas is, for example, in the range of 180° to 220° C. Subsequently, the gas is heated in a combustion chamber 21, by means of in-line burners to, e.g., 220° to 300° C. For this purpose, acid gas—supplied by pipe 22—together with air—supplied by pipe 23—are burned in the combustion chamber 21. The gas is then subjected to further reaction at a Claus contact 24 and then freed of the sulfur formed in the cooler/condensor 25. The gas, which has been cooled to between 140° and 180° C., is then reheated in a further combustion chamber 26 by the burning of acid gas (pipe 27) with air (pipe 28), e.g. to a temperature between 180° and 250° C., subjected to further reaction at the Claus contact 29 and then finally cooled for sulfur condensation in the cooler/condensor 30. After cooling to between b 120° and 150° C. and separation of the sulfur, the gas gets to a third, and—if necessary—fourth Claus contact step and/or to an after burning installation.

The cooler/separator 20, 25, 30, shown in FIG. 3, can be seen in a larger scale in FIG. 4. Between tube sheets, it has a bank of tubes, the central pipes of which 34 can be charged with gas through a pipe nozzle $38^b$, while the pipes 35 in the circular space surrounding the central pipes 34, can be charged with gas through a nozzle $38^a$. The gas supply to the condensor 30 takes place through pipe 32, whereby the central pipes 34 can be charged through pipe $32^b$ with the shut-off device 33, while the pipes 35 in the circular space are charged through the partial pipe $32^a$. On the flow off side of the bank of tubes is the separator on which the sulfur droplets which are formed are deposited. The liquid sulfur is collected in the trap 39 and is removed by pipe 37. The reaction gas leaves the separator through pipe 31. This construction permits the reduction of the cooling surface to the pipes 35 within the circular space by closing off pipe $32^b$ when the load drops to a certain value, such as 50%.

METHODS OF OPERATION

1. Operation in a load range of between 100 and 25%.

Five percent of the $H_2S$ containing gas is—in a controlled amount—brought to the by-pass burner 4 and led into the combustion zone $1^a$ without combustion air. The remaining 20 to 95% is—under regulated pressure—together with the air necessary for the process, burned in the main burner 3, whereby the amount of acid gas needed for the inline burners 21, 26 can be removed from this amount. The non-operating heating gas burner 5 is rinsed with a part of the combustion air or an inert gas in order to prevent the the penetration of sulfur vapors into the burner. When dropping below the reaction temperature—generally near about 1000° C.—in the combustion chamber $1^a$ or the reaction chamber $1^b$, the heating gas burner 5 is lit and the rinsing stopped. The process chromatograph controls the amount of air supplied to the main burner 3.

2. Operation in the load range of between 25 and 5%.

When reaching a load of 25%, i.e. 20% to the main burner 3 and 5% to the by-pass burner 4, the main burner 3 is shut off and rinsed with inert gas. The amount of acid gas is burned under regulated pressure in by-pass burner 4, together with the amount of air necessary for the process. If the heating gas burner 5 is not in operation, it is now switched on at the latest, in order to assure a safe operation down to a load of 5%. The regulating of the amount of processing air by the process chromatograph is done through valve 15 in the by-pass 16 to the air valve $10^c$ of the air pipe $7^c$ to the burner 5.

3. Load range of between 25 and 5% when operating the in-line burners with acid gas.

The combustion of acid gas in the in-line burners 21, 26, and possibly further in-line burners, takes place between stoichiometric amounts of air for combustion to $SO_2$ ($2=0.9$ to $0.95$) and for combustion to sulfur in order to avoid a surplus of $O_2$. In order to prevent a dropping below the minimum ratio of air to acid gas for the by-pass burner 4 (maintenance of the flame), this ratio is given and with it the by-pass burner 4 operated below stoichiometric level. The fine regulation of the amount of processing air is done as described under 2. When reaching a minimum amount of acid gas, such as 10 to 15% (depending on the acid gas concentration), the air supply to the by-pass burner 4 is shut off. The air regulation takes place—as before—through the combustion air for the heating gas. The transformation into elementary sulfur then takes place mainly in the reaction zone $1^b$ of the combustion oven 1.

In the process according to the invention it is possible that the variations of the load can be based on changes in the gas processing, and, furthermore, also on variations in the $H_2S$ concentration.

I claim:

1. A process for the combustion of $H_2S$ containing gases with either air or oxygen or both into elemental sulfur and the separation of the sulfur from the reaction gas, the process comprising:

burning the $H_2S$ containing gases with air or oxygen or both in a load range of 100 to 5% including a high load range and a low load range in a combustion chamber and adjoining reaction chamber, the amount of air or oxygen or both being of sufficient quantity to produce the required ratio of hydrogen sulfide to sulfur dioxide at the exit of the process;

cooling the reaction gas from the reaction chamber in a cooling chamber to condense and separate the sulfur therefrom;

said burning including, in the high load range between 100% and 15% to 40%, burning the $H_2S$ by one or more main burners in the combustion chamber, and, in the low load range between 15% to 40% and 5%, burning the $H_2S$ in a bypass burner in the combustion chamber along with burning a heating gas in the combustion chamber; and reducing the cooling surfaces in the cooling chamber when burning in the low load range.

2. A process according to claim 1 wherein the heating gas burner is switched on or off so that the temperature in the reaction chamber or combustion chamber is maintained in the range from about 900° C. to about 1150° C.

3. A process according to claim 1 wherein the heating gas is burned at a load in the range from 40% to 5%.

4. A process according to claim 3 wherein the heating gas is burned at a load of in the range from 25% to 5%.

5. A process according to claim 1 wherein the cooling surfaces in the cooling chamber are reduced to a value such that no mist of elemental sulfur is formed.

6. A process according to claim 1 wherein the air supply to the combustion chamber is regulated by a process chromatograph in the high load range through the amount of air to the main burner and in the low load range through the amount of air to the heating gas burner.

7. A process according to claim 6 wherein the switch is made at a load of about 25%.

8. A process according to claim 1 characterized by the fact that the air supply to the by-pass burner is limited to a load range of 8 to 25%.

* * * * *

UNITED STATES PATENT AND TRADEMARK OFFICE
CERTIFICATE OF CORRECTION

PATENT NO. : 4,501,725

DATED : February 26, 1985

INVENTOR(S) : Rainer Lell

It is certified that error appears in the above-identified patent and that said Letters Patent is hereby corrected as shown below:

Column 4, line 33, after the word "between" please delete "b".

Signed and Sealed this

Third Day of September 1985

[SEAL]

Attest:

DONALD J. QUIGG

*Attesting Officer*     *Acting Commissioner of Patents and Trademarks - Designate*